July 30, 1929. A. E. OWEN ET AL 1,722,855
VEHICLE WHEEL
Filed Nov. 10, 1926
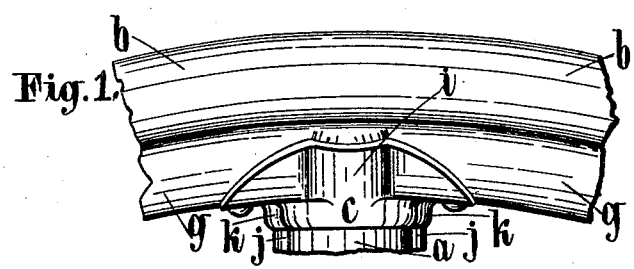
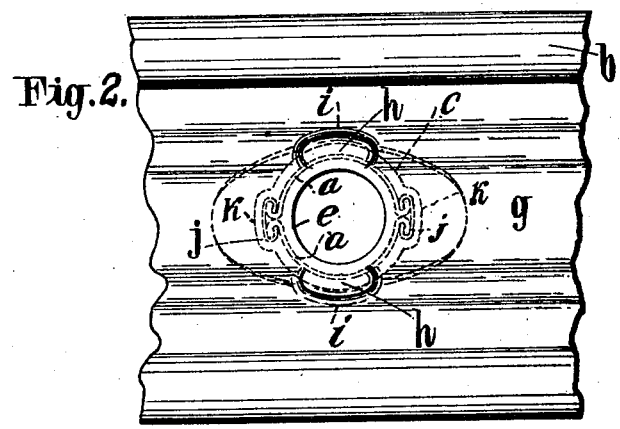
INVENTORS
A. E. Owen
BY A. W. Downs
ATTORNEYS Patented July 30, 1929.

1,722,855

UNITED STATES PATENT OFFICE.

ALFRED ERNEST OWEN AND ROBERT WILFORD DOWNS, OF DARLASTON, ENGLAND.

VEHICLE WHEEL.

Application filed November 10, 1926, Serial No. 147,545, and in Great Britain February 22, 1926.

Our invention relates to improvements in vehicle wheels and more particularly to improved means, in metal vehicle wheels, for securing the outer ends of the spokes to the rim, and the object of the invention is to provide means for securing the outer ends of the spokes to the rim in such a manner that the connection will be more rigid and rugged, and in which any wrenching or twisting action of the rim at the outer ends of the spokes is resisted, fracture at these points being thus obviated.

Our invention consists of a vehicle wheel constructed and arranged all as hereinafter more particularly described, and illustrated in the accompanying drawing in which:

Fig. 1 represents a side elevation of a portion of a rim showing our improved connection between the same and the outer end of a spoke.

Fig. 2 is a plan view of a portion of the rim showing the disposition of the spoke and our improved connection in dotted lines.

Like characters of reference indicate corresponding parts in the different views.

The spokes $a$ are secured to the felloe portion $g$ of the rim $b$, which in the form shown is of the well-based type, by means of flanged reinforcing ferrules $c$ applied to the outer ends of the spokes. The ferrule flange is suitably curved to conform with the shape of the felloe portion $g$ of the rim $b$, and is secured thereto by any suitable means, such as by rivets or spotwelding.

A portion $e$ of the felloe portion $g$ of the rim $b$ is swaged out to form a spigot which extends into the tubular spoke $a$ and is secured thereto, if desired, by any suitable means, such as welding.

The felloe $g$ is provided with projections $h$ disposed on each side of the spoke $a$ which are received into indentations $i$ formed in the flanges of the ferrules $c$. Such indentations are constituted by pressing outwardly the medial portions thereof. Such ferrules preferably project beyond the outer end of the spokes.

In the form illustrated in the drawing the spoke is composed of a pair of stampings joined together at their edges by a pair of channel strips whereby a pair of beads $j$ are constituted on such spoke. Provision must, in this case, be made for such beads $j$ by the formation of hollow protrusions or projections $k$ in the ferrule $c$.

By providing the projections $h$ and indentations $i$ the driving strain of the wheel is directly taken by the rim and the ferrules $c$.

What we claim is:—

1. A wheel comprising a plurality of hollow metal spokes open at the outer ends, a channel shaped metal rim, spigots swaged from said rim and entering the outer ends of the spokes, and reinforcing ferrules applied to the exterior surfaces of the outer ends of the spokes and projecting therebeyond to form flanges conforming to and closely embracing inner side portions of the rim, the medial portions of the flanges of each ferrule being outwardly pressed to provide indentations receiving corresponding projections pressed outwardly from said inner side portions of the rim.

2. A wheel comprising a plurality of hollow metal spokes open at their outer ends, a channel shaped metal rim, and reinforcing ferrules fixed to the exterior surfaces of the outer ends of the spokes and projecting therebeyond to form flanges closely embracing opposite inner side portions of the rim, the spoke engaging flanges of each ferrule being outwardly pressed to provide indentations located at opposite sides of the spoke in the circumferential line of the rim and receiving correspondingly shaped projections carried by the spoke and the rim engaging flanges of each ferrule being provided with outwardly pressed portions forming indentations receiving corresponding outwardly pressed portions of the rim and located in a plane at right angles to the plane containing the first mentioned indentations.

In testimony whereof we affix our signatures.

ALFRED ERNEST OWEN.
ROBERT WILFORD DOWNS.